US009251546B2

(12) United States Patent
Beggs et al.

(10) Patent No.: US 9,251,546 B2
(45) Date of Patent: Feb. 2, 2016

(54) SYSTEM AND METHOD FOR EVALUATING OPERATION OF A VEHICLE WITH RESPECT TO A PLURALITY OF ENVIRONMENTAL FACTORS

(75) Inventors: Robert M. Beggs, West Chester, PA (US); Garry Anthony Barber, Richmond (CA); James Douglas Matheny, Hopkinsville, KY (US)

(73) Assignee: THE BOEING COMPANY, Chicago, IL (US)

( * ) Notice: Subject to any disclaimer, the term of this patent is extended or adjusted under 35 U.S.C. 154(b) by 357 days.

(21) Appl. No.: 13/053,886

(22) Filed: Mar. 22, 2011

(65) Prior Publication Data

US 2012/0245767 A1 Sep. 27, 2012

(51) Int. Cl.
*G06F 17/00* (2006.01)
*G06Q 50/30* (2012.01)

(52) U.S. Cl.
CPC ...................................... *G06Q 50/30* (2013.01)

(58) Field of Classification Search
CPC ....... G06Q 50/30; G06Q 10/10; G06Q 30/02; G06Q 10/0639; G01H 17/00; G08G 5/0078; Y02T 10/47
USPC .............................................................. 701/3
See application file for complete search history.

(56) References Cited

U.S. PATENT DOCUMENTS 6,909,947 B2 6/2005 Douros et al.
6,925,425 B2 8/2005 Remboski et al.
7,292,152 B2 11/2007 Torkkola et al.
7,565,230 B2 7/2009 Gardner et al.
7,616,129 B2 11/2009 Thacher
8,140,213 B2 3/2012 Boss et al.
2003/0217036 A1* 11/2003 Haunschild ............ G06Q 10/10 1/1
2010/0070316 A1* 3/2010 Lieberman et al. ........... 701/213
2010/0206042 A1* 8/2010 Johns ...................... F01N 11/00 73/23.31
2011/0046818 A1* 2/2011 Herkes ................... G01H 17/00 701/3
2011/0184784 A1* 7/2011 Rudow ................... G06Q 30/02 705/7.38
2012/0088462 A1 4/2012 Mader et al.

* cited by examiner

*Primary Examiner* — Adam Tissot
(74) *Attorney, Agent, or Firm* — Armstrong Teasdale LLP

(57) ABSTRACT

A system installed with a vehicle for evaluating operation of the vehicle with respect to environmental factors includes: (a) operational sensors for sensing data relating to operational factors of the environmental factors; (b) an operational information store coupled with selected sensors for storing operational data received from the selected sensors relating to the operational factors; (c) an operational standards store for storing operational standards associated with operating the vehicle; (d) an operational standard compliance evaluation unit coupled with the information store and coupled with the standards store for effecting comparison of the operational data with the operational standards to ascertain an operational comparison result, and determining whether the vehicle complies with the standards based upon the comparison result; and (e) an operational report and store unit coupled with the compliance evaluation unit for receiving the operational determination and generating at least one report relating to the operational determination.

17 Claims, 3 Drawing Sheets

SYSTEM AND METHOD FOR EVALUATING OPERATION OF A VEHICLE WITH RESPECT TO A PLURALITY OF ENVIRONMENTAL FACTORS

TECHNICAL FIELD

The present disclosure is directed to evaluating operation of a vehicle with respect to environmental factors, and especially to evaluating operation of an aerospace vehicle with respect to environmental factors.

BACKGROUND

Prior art systems monitoring vehicle operation may be generalized as maintenance management systems or vehicle health management systems having no overt focus on addressing environmental concerns such as compliance with Environmental Protection Agency (EPA) regulations or management of carbon credits. Such a characteristic of maintenance management systems relating to aerospace vehicles is particularly environmentally significant because such vehicles may be cited as contributors to global warming or climate change.

Currently available systems monitoring vehicle operation, such as maintenance management systems, are not known to comprehensively address environmental issues. According to the US Department of Energy, vehicles may produce several times their weight in greenhouse gases each year. Transportation-related greenhouse gas emissions may account for as much as 29 percent of total greenhouse gas emissions in the US, and as much as 5 percent of global greenhouse gas emissions. Other environmental issues may also be related with vehicle operation and maintenance such as recycling materials and fluids, safely disposing of hazardous materials and modifying maintenance schedules to minimize environmental impact.

There is a need for a system and method for evaluating operation of a vehicle with respect to a plurality of environmental factors.

SUMMARY

A system for evaluating operation of a vehicle with respect to environmental factors includes: (a) operational sensors installed with the vehicle for sensing data relating to operational factors of the environmental factors; (b) at least one operational information store coupled with selected operational sensors and installed with the vehicle for storing operational data received from the selected operational sensors relating to the operational factors; (c) an operational standards store installed with the vehicle for storing operational standards associated with operating the vehicle; (d) an operational standard compliance evaluation unit coupled with the operational information store and coupled with the operational standards store for effecting comparison of the operational data with the operational standards to ascertain an operational comparison result and determining whether the vehicle complies with the operational standards based upon the operational comparison result; and (e) an operational report and store unit coupled with the operational standard compliance evaluation unit for receiving the operational determination; the operational report and store unit generating at least one report relating to the operational determination.

The system may also include: (f) a plurality of support sensors coupled with a support facility supporting the vehicle for sensing data relating to a plurality of support factors of the plurality of environmental factors; (g) at least one support information store coupled with selected support sensors of the plurality of support sensors and installed with the support facility for storing support data received from the selected support sensors relating to the support factors; (h) a support standards store coupled with the support facility for storing support standards associated with operating the support facility; (i) a support standard compliance evaluation unit coupled with the support information store and coupled with the support standards store; the support standard compliance evaluation unit effecting comparison of the support data with the support standards to ascertain a support comparison result; the support standard compliance evaluation unit effecting a support determination of whether the support facility complies with the support standards based upon the support comparison result; and (j) a support report and store unit coupled with the support standard compliance evaluation unit for receiving the indication of the support determination; the support report and store unit generating at least one report relating to the support determination.

A method for evaluating operation of a vehicle with respect to a plurality of environmental factors includes: (a) in no particular order: (1) sensing data relating to a plurality of operational factors of said plurality of environmental factors using a plurality of operational sensors installed with said vehicle; and (2) storing operational standards associated with operating said vehicle in an operational standards store installed with said vehicle; (b) storing operational data received from the selected operational sensors relating to the operational factors in at least one operational information store installed with the vehicle; (c) comparing the operational data with the operational standards in an operational standard compliance evaluation unit installed with the vehicle to ascertain an operational comparison result; (d) effecting an operational determination of whether the vehicle complies with the operational standards based upon the operational comparison result; and (e) generating at least one report relating to the operational determination.

The method may also include steps performed in parallel with steps (a) through (f): (g) in no particular order: (1) sensing data relating to a plurality of support factors of said plurality of environmental factors using a plurality of operational sensors installed with a support facility supporting said vehicle; and (2) storing support standards associated with operating said support facility in a support standards store installed with said support facility; (h) storing support data received from the selected support sensors relating to the support factors in at least one support information store installed with the support facility; (i) comparing the support data with the support standards in a support standard compliance evaluation unit installed with the support facility to ascertain a support comparison result; (j) effecting a support determination of whether the support facility complies with the support standards based upon the support comparison result; and (k) generating at least one report relating to the support determination.

It is, therefore, a feature of the present disclosure to provide a system and method for evaluating operation of a vehicle with respect to a plurality of environmental factors.

Further objects and features of the present disclosure will be apparent from the following specification and claims when considered in connection with the accompanying drawings, in which like elements may be labeled using like reference numerals in the various figures, illustrating the preferred embodiments of the disclosure.

DETAILED DESCRIPTION

The terms "coupled" and "connected", along with their derivatives, may be used herein. It should be understood that these terms are not intended as synonyms for each other. Rather, in particular embodiments, "connected" may be used to indicate that two or more elements are in direct physical or electrical contact with each other. "Coupled" may be used to indicate that two or more elements are in either direct or indirect (with other intervening elements between them) physical or electrical contact with each other, or that two or more elements or steps co-operate or interact with each other (e.g. as in a cause and effect relationship) with no third element or step intervening between the cooperating or interacting elements.

Figure 1:
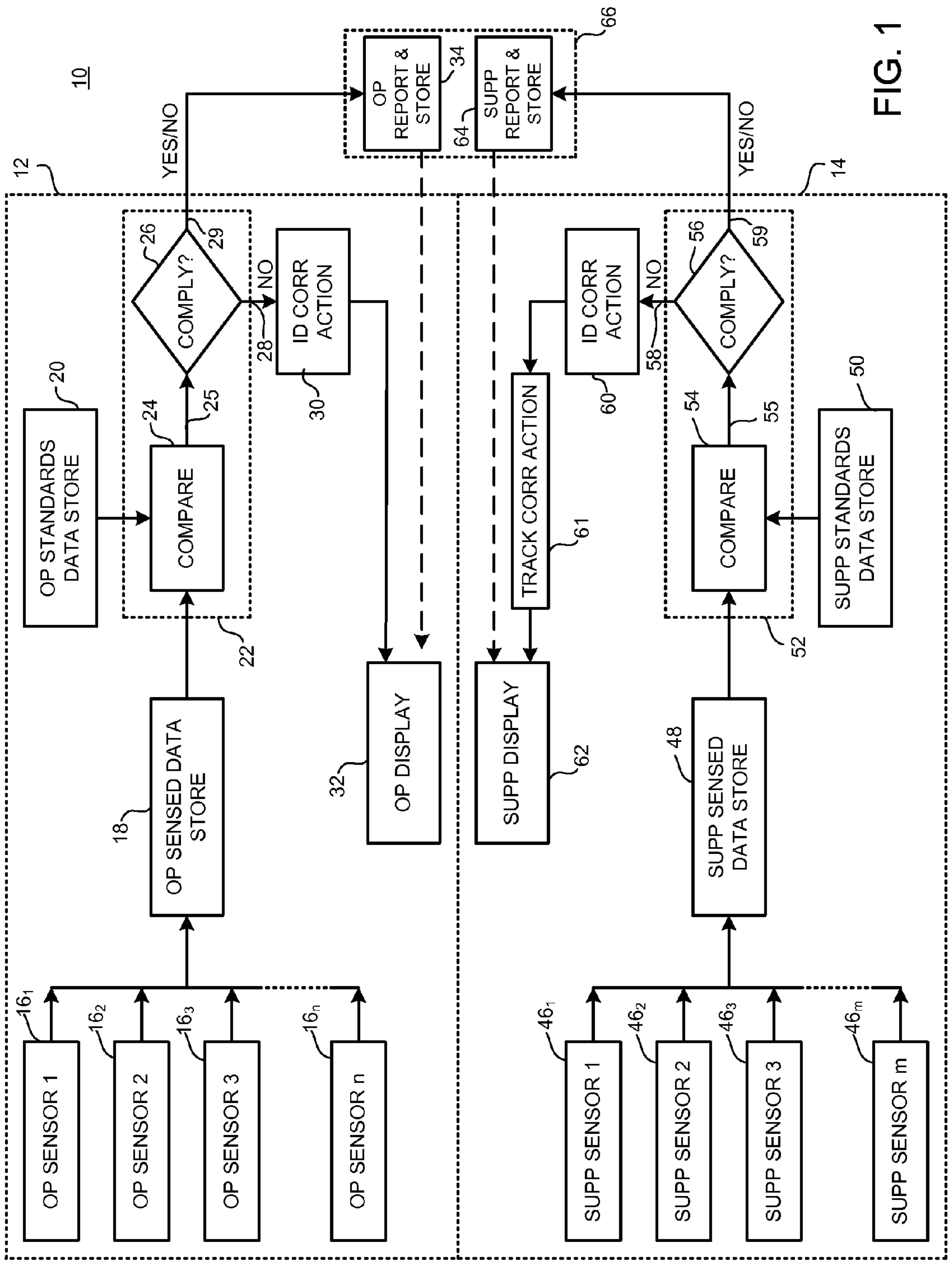
FIG. 1 is a schematic diagram of a system for evaluating operation of a vehicle with respect to a plurality of environmental factors according to the teachings of this disclosure.

FIG. 1 is a schematic diagram of a system for evaluating operation of a vehicle with respect to a plurality of environmental factors according to the teachings of this disclosure. In FIG. 1, a system 10 includes an operational section 12 and a support section 14. Operational section 12 may be installed on board the vehicle and support section 14 may be installed in a support facility that supports the vehicle with maintenance and other services.

Operational section 12 may include a plurality of operational sensors $\mathbf{16}_1$, $\mathbf{16}_2$, $\mathbf{16}_3$, $\mathbf{16}_n$. The indicator "n" is employed to signify that there can be any number of operational sensors in operational section 12. The inclusion of four operational sensors $\mathbf{16}_1$, $\mathbf{16}_2$, $\mathbf{16}_3$, $\mathbf{16}_n$ in FIG. 1 is illustrative only and does not constitute any limitation regarding the number of operational sensors that may be included in operational section 12 of the present disclosure. Throughout this description, use of a reference numeral using a generic subscript herein may be taken to mean that any respective member of the plurality of elements having the same reference numeral may be regarded as included in the description. Thus, by way of example and not by way of limitation, referring to $\mathbf{16}_n$ in describing FIG. 1 may be taken to mean that any operational sensor—$\mathbf{16}_1$, $\mathbf{16}_2$, $\mathbf{16}_3$, or $\mathbf{16}_n$ (FIG. 1)—may be regarded as capable of employment as described.

Operational sensors $\mathbf{16}_n$ may be coupled with an operational information store 18. Operational information store 18 may store operational data received from one or more operational sensor $\mathbf{16}_n$.

Operational section 12 may also include an operational standards store 20 for storing operational standards associated with operating the vehicle in which operation section 12 is installed (i.e., the monitored vehicle).

Operational information store 18 and operational standards store 20 may be coupled with an operational standard compliance evaluation unit 22. Operational standard compliance evaluation unit 22 may include an operational comparing unit 24 coupled with an operational evaluating unit 26. Operational comparing unit 24 may be coupled with operational information store 18 and with operational standards store 20 to effect comparison of operational data received from operational information store 18 with operational standards received from operational standards store 20. Operational comparing unit 24 may present an operational comparison result at a comparison output locus 25 based upon the operational data-operational standards comparison. Operational evaluating unit 26 may employ the operational data-operational standards comparison to effect an operational determination of whether the monitored vehicle complies with operational standards stored in operational standards store 20.

If operational evaluating unit 26 determines that the monitored vehicle does not comply with operational standards stored in operational standards store 20, an output may be presented from operational evaluating unit 26 to an operational corrective action identification unit 30 via a NO output locus 28. Operational corrective action identification unit 30 may generate at least one operational corrective action for correcting a failure to comply with at least one operational standard, the failure to comply being indicated by the output presented via NO output locus 28. Operational corrective action identification unit 30 may present an indication of the identified failure, an operational alert (which may identify a corrective action) and other information to an operational display unit 32 for viewing by a user or operator of the monitored vehicle. Operational display unit 32 may be a dedicated display unit associated with system 10, or may be a display unit shared with other systems installed or coupled with the monitored vehicle. Operational display unit 32 may be embodied in any unit that may display information including, but not limited to, a video display screen, an indicator light, an array of a plurality of indicator lights or another display array or unit.

Operational evaluating unit 26 may also present an indication of the operational determination of whether the monitored vehicle complies with operational standards stored in operational standards store 20 via a YES/NO output locus 29 to an operational report and store unit 34. That is, whether there is compliance with standards or not, an indication of the operational determination may be presented at YES/NO output locus 29. Operational report and store unit 34 may generate at least one report relating to the operational determination. In an alternate embodiment, operational report and store unit 34 may also provide an indication relating to the determination to operational display unit 32. The alternative nature of the providing of information to operational display unit 32 is indicated by a dotted line connection between operational report and store unit 34 and operational display unit 32. Operational report and store unit 34 may be installed on the monitored vehicle or may be situated distal from the vehicle, such as at a support facility. If operational report and store unit 34 is situated distal from the monitored vehicle, a wireless connection with the vehicle may be employed to provide information from operational report and store unit 34 to operational display unit 32. Alternatively, information may be provided by operational report and store unit 34 to operational display unit 32 using exportable media such as, by way of example and not by way of limitation, thumb drive, disk, or Personal Computer Memory Card International Association (PCMCIA) media.

Operational display unit 32 may be configured to incorporate environmental or green themes in presentations to emphasize the environmental nature of information presented, such as leaves, vines or other environmentally suggestive icons or images.

Support section 14 may include a plurality of operational sensors 46$_1$, 46$_2$, 46$_3$, 46$_m$. The indicator "m" is employed to signify that there can be any number of support sensors in support section 14. The inclusion of four support sensors 46$_1$, 46$_2$, 46$_3$, 46$_m$ in FIG. 1 is illustrative only and does not constitute any limitation regarding the number of support sensors that may be included in support section 14 of the present disclosure.

Support sensors 46$_m$ may be coupled with a support information store 48. Support information store 48 may store support data received from one or more support sensor 46$_m$.

Support section 14 may also include a support standards store 50 for storing support standards associated with operating the support facility in which support section 14 is installed (i.e., the monitored support facility).

Support information store 48 and support standards store 50 may be coupled with a support standard compliance evaluation unit 52. Support standard compliance evaluation unit 52 may include a support comparing unit 54 coupled with a support evaluating unit 56. Support comparing unit 54 may be coupled with support information store 48 and with support standards store 50 to effect comparison of support data received from support information store 48 with support standards received from support standards store 50. Support comparing unit 54 may present a support comparison result at a support output locus 55 based upon the support data-support standards comparison. Support evaluating unit 56 may employ the support data-support standards comparison to effect a support determination of whether the monitored support facility complies with support standards stored in support standards store 50.

If support evaluating unit 56 determines that the monitored support facility does not comply with support standards stored in support standards store 50, an output may be presented from support evaluating unit 56 to a support corrective action identification unit 60 via a NO output locus 58. Operational corrective action identification unit 60 may present an indication of the identified failure, a support alert and other information to a support display unit 62 for viewing by a user or operator of the monitored support facility. Support display unit 62 may be a dedicated display unit associated with system 10, or may be a display unit shared with other systems installed or coupled with the monitored vehicle. Support display unit 62 may be embodied in any unit that may display information including, but not limited to, a video display screen, an indicator light, an array of a plurality of indicator lights or another display array or unit.

Support corrective action identification unit 60 may generate at least one support corrective action for correcting a failure to comply with at least one support standard, the failure to comply being indicated by the output presented via NO output locus 58. Support corrective action identification unit 60 may present an indication of the identified failure, the identified corrective action and other information to a support display unit 62 for viewing by a user or operator of the monitored support facility. A support corrective action tracking unit 61 may be coupled with support corrective action identification unit 60 and support display unit 62. Support corrective action tracking unit 61 may generate an achievement indication regarding level of achievement of a corrective action identified by support corrective action identification unit 60 and support corrective action tracking unit 61 may present achievement indications for display by support display unit 62.

Support evaluating unit 56 may also present an indication of the support determination of whether the monitored support facility complies with support standards stored in support standards store 50 via a YES/NO output locus 59 to a support report and store unit 64. That is, whether there is compliance with standards or not, an indication of the support determination may be presented at YES/NO output locus 59. Support report and store unit 64 may generate at least one report relating to the support determination. In an alternate embodiment, support report and store unit 34 may also provide an indication relating to the determination to support display unit 62. The alternative nature of the providing of information to support display unit 62 is indicated by a dotted line connection between support report and store unit 64 and support display unit 62. Support report and store unit 64 may be installed at the monitored support facility or may be situated distal from the monitored support facility. If support report and store unit 64 is situated distal from the monitored support facility, a remote connection with the monitored support facility may be employed to provide information from support report and store unit 64 to support display unit 62. Such a remote connection may be established by any known communication arrangement such as, by way of example and not by way of limitation, a wireless connection, an Internet connection, a Voice over Internet Protocol (VoIP) connection, a Plain Old Telephone System (POTS) connection via the Public Switched Telephone Network (PSTN), a satellite connection or another connection known to those skilled in the art of remote station communications. Alternatively, information may be provided by support report and store unit 64 to operational display unit 62 using exportable media such as, by way of example and not by way of limitation, thumb drive, disk, or Personal Computer Memory Card International Association (PCMCIA) media.

Operational report and store unit 34 and support report and store unit 64 may be embodied in a single report and store unit 66.

Figure 2:
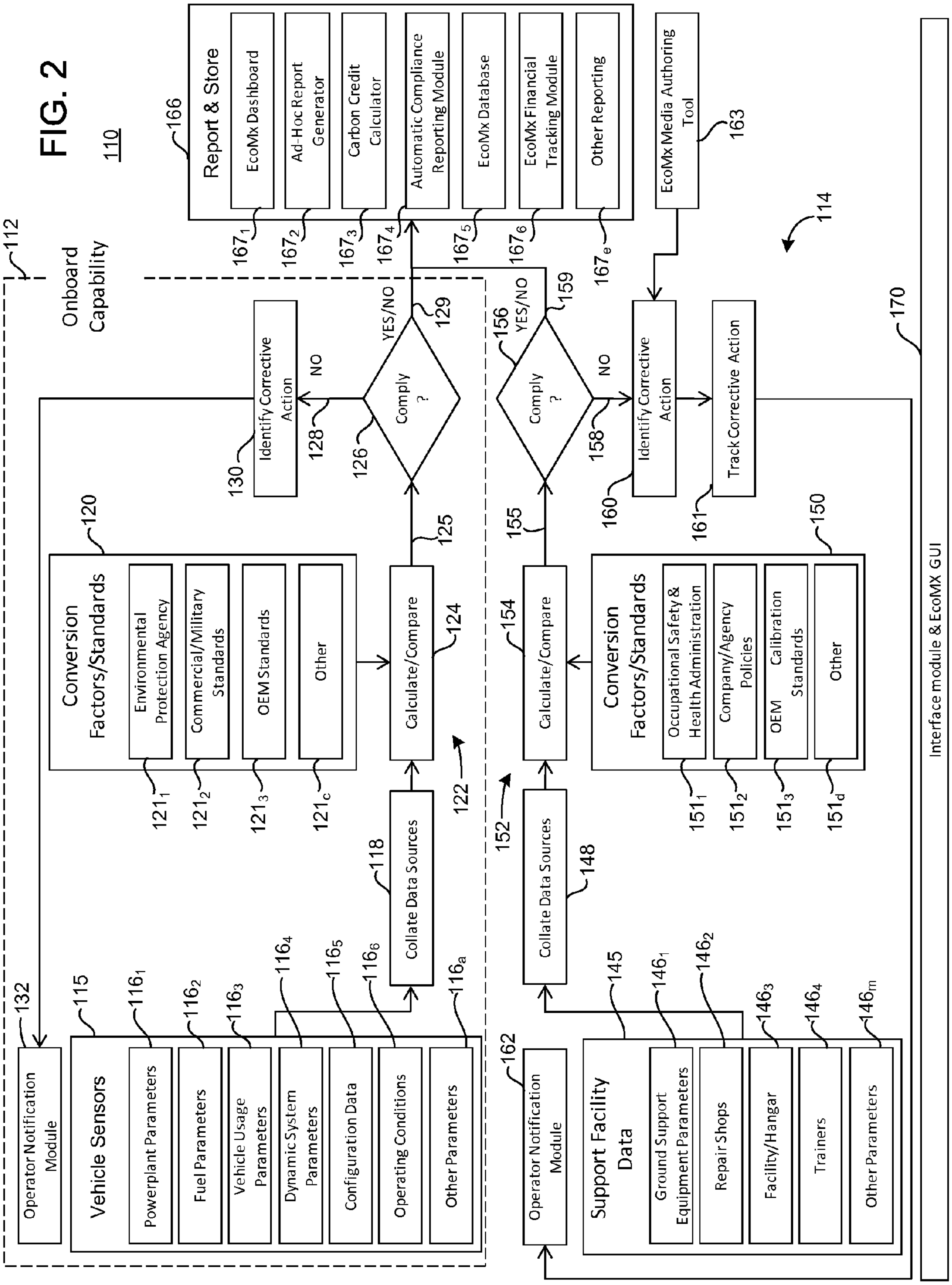
FIG. 2 is a schematic diagram of a system for evaluating operation of aerospace vehicle with respect to a plurality of environmental factors according to the teachings of this disclosure.

FIG. 2 is a schematic diagram of a system for evaluating operation of aerospace vehicle with respect to a plurality of environmental factors according to the teachings of this disclosure. In FIG. 2, a system 110 includes an operational section 112 and a support section 114. By way of example and not by way of limitation, in the context of an aircraft or other aerospace vehicle operational section 112 maybe installed on board the aerospace vehicle and support section 114 may be installed in a ground support facility that supports the aerospace vehicle with maintenance and other services.

Operational section 112 may include an operational vehicle sensor unit 115. Operational vehicle sensor unit 115 may include a plurality of operational sensors generating sensed operational data such as, by way of example and not by way of limitation, powerplant parameter sensor 116$_1$, fuel parameter sensor 116$_2$, vehicle usage parameter sensor 116$_3$, dynamic system parameter sensor 116$_4$, configuration data sensor 116$_5$, operating conditions data sensor 116$_6$ and other parameter sensor 116$_n$. The indicator "n" is employed to signify that there can be any number of operational sensors in operational vehicle sensor unit 115. The inclusion of seven operational sensors 116$_1$, 116$_2$, 116$_3$, 116$_4$, 116$_5$, 116$_6$, 116$_n$ in FIG. 2 is illustrative only and does not constitute any limitation regarding the number of operational sensors that may be included in operational vehicle sensor unit 115 of the present disclosure.

Operational sensors 116$_n$ may be coupled with an operational information store 118. Operational information store 118 may store (and may collate) operational data received from one or more operational sensor 116$_n$.

Operational section 112 may also include an operational standards store 120 for storing operational standards or conversion factors associated with operating the vehicle in which operation section 112 is installed (i.e., the monitored vehicle). Operational standards store 120 may store, by way of example and not by way of limitation, Environmental Protection Agency (EPA) standards $\mathbf{121}_1$, commercial or military standards $\mathbf{121}_2$, Original Equipment Manufacturer (OEM) standards $\mathbf{121}_3$ and other standards or conversion factors $\mathbf{121}_c$. The indicator "c" is employed to signify that there can be any number of operational standards or conversion factors stored in operational standards store 120. The inclusion of four operational standards or conversion factors $\mathbf{121}_1$, $\mathbf{121}_2$, $\mathbf{121}_3$, $\mathbf{121}_c$ in FIG. 2 is illustrative only and does not constitute any limitation regarding the number of operational standards or conversion factors that may be included in operational standards store 120 of the present disclosure.

Operational information store 118 and operational standards store 120 may be coupled with an operational standard compliance evaluation unit 122. Operational standard compliance evaluation unit 122 may include an operational comparing unit 124 coupled with an operational evaluating unit 126. Operational comparing unit 124 may be coupled with operational information store 118 and with operational standards store 120 to effect comparison of operational data received from operational information store 118 with operational standards received from operational standards store 120. Operational comparing unit 124 may present an operational comparison result at a comparison output locus 125 based upon the operational data-operational standards comparison. Operational evaluating unit 126 may employ the operational data-operational standards comparison to effect an operational determination of whether the monitored vehicle complies with operational standards stored in operational standards store 120.

If operational evaluating unit 126 determines that the monitored vehicle does not comply with operational standards stored in operational standards store 120, an output may be presented from operational evaluating unit 126 to an operational corrective action identification unit 130 via a NO output locus 128. Operational corrective action identification unit 130 may generate at least one operational alert to an aircraft operator. The operational alert may identify at least one operational corrective action for correcting a failure to comply with at least one operational standard, the failure to comply being indicated by the output presented via NO output locus 128. Operational corrective action identification unit 130 may present an indication of the identified failure, the identified corrective action and other information to an operational display unit 132 for viewing by a user or operator of the monitored vehicle. Operational display unit 132 may be a dedicated display unit associated with system 110, or may be a display unit shared with other systems installed or coupled with the monitored vehicle. Operational display unit 132 may be embodied in any unit that may display information including, but not limited to, a video display screen, an indicator light, an array of a plurality of indicator lights or another display array or unit.

Operational evaluating unit 126 may also present an indication of the operational determination of whether the monitored vehicle complies with operational standards stored in operational standards store 120 via a YES/NO output locus 129 to a report and store unit 166. That is, whether there is compliance with standards or not, an indication of the operational determination may be presented at YES/NO output locus 129. Report and store unit 166 may generate at least one report relating to the operational determination.

By way of example and not by way of imitation, report and store unit 166 may report or store data relating to the following entities or subjects: EcoMx (Ecological Maintenance) dashboard $\mathbf{167}_1$, ad hoc report generator $\mathbf{167}_2$, carbon credit calculator $\mathbf{167}_3$, automatic compliance reporting module $\mathbf{167}_4$, EcoMx database $\mathbf{167}_5$, EcoMx financial tracking module $\mathbf{167}_6$ and other reporting or storing entities or subjects $\mathbf{167}_e$. The indicator "e" is employed to signify that there can be any number of reporting or storing entities or subjects treated in report and store unit 166. The inclusion of seven reporting or storing entities or subjects $\mathbf{167}_1$, $\mathbf{167}_2$, $\mathbf{167}_3$, $\mathbf{167}_4$, $\mathbf{167}_5$, $\mathbf{167}_6$, $\mathbf{167}_e$ in FIG. 2 is illustrative only and does not constitute any limitation regarding the number of reporting or storing entities or subjects that may be treated in report and store unit 166 of the present disclosure.

In an alternate embodiment, report and store unit 166 may also provide an indication relating to the operational determination presented at YES/NO output locus 129 to operational display unit 132. This alternative providing is not specifically illustrated in FIG. 2 in order to avoid cluttering FIG. 2. See FIG. 1 for an illustration of such an alternative providing. Report and store unit 166 may be installed on the monitored vehicle or may be situated distal from the vehicle, such as at a support facility or ground support facility. Report and store unit 166 may be apportioned between a monitored vehicle and an associated support facility. This apportioned arrangement is not illustrated but is within the understanding of one skilled in the art of vehicle monitoring system design. If report and store unit 166 is situated distal from the monitored vehicle, a wireless connection with the vehicle may be employed to provide information from report and store unit 166 to operational display unit 132. Information may also be provided by report and store unit 166 to operational display unit 132 using exportable media such as, by way of example and not by way of limitation, thumb drive, disk, or Personal Computer Memory Card International Association (PCMCIA) media.

Operational display unit 132 may be configured to incorporate environmental or green themes in presentations to emphasize the environmental nature of information presented, such as leaves, vines or other environmentally suggestive icons or images.

Support section 114 may include a support sensor unit 145 installed at a support facility associated with the monitored vehicle (i.e., the monitored support facility). Support sensor unit 145 may include a plurality of support sensors generating sensed support data such as, by way of example and not by way of limitation, ground support equipment parameter sensor $\mathbf{146}_1$, repair shop sensor $\mathbf{146}_2$, facility or hangar sensor $\mathbf{146}_3$, trainer parameter sensor $\mathbf{146}_4$, and other parameter sensor $\mathbf{146}_m$. The indicator "m" is employed to signify that there can be any number of support sensors in support sensor unit 145. The inclusion of five support sensors $\mathbf{146}_1$, $\mathbf{146}_2$, $\mathbf{146}_3$, $\mathbf{146}_4$, $\mathbf{146}_m$ in FIG. 2 is illustrative only and does not constitute any limitation regarding the number of support sensors that may be included in support sensor unit 145 of the present disclosure.

Support sensors $\mathbf{146}_m$ may be coupled with a support information store 148. Support information store 148 may store (and may collate) support data received from one or more support sensor $\mathbf{146}_m$.

Support section 114 may also include a support standards store 150 for storing support standards or conversion factors associated with operating the monitored support facility. Support standards store 150 may store, by way of example and not by way of limitation, Occupational Safety and Health Administration (OSHA) standards $\mathbf{151}_1$, company or agency policies $151_2$, Original Equipment Manufacturer (OEM) calibration standards $151_3$ and other standards or conversion factors $151_d$. The indicator "d" is employed to signify that there can be any number of support standards or conversion factors stored in support standards store 150. The inclusion of four support standards or conversion factors $151_1$, $151_2$, $151_3$, $151_d$ in FIG. 2 is illustrative only and does not constitute any limitation regarding the number of support standards or conversion factors that may be included in support standards store 150 of the present disclosure.

Support information store 148 and support standards store 150 may be coupled with a support standard compliance evaluation unit 152. Support standard compliance evaluation unit 152 may include a support comparing unit 154 coupled with a support evaluating unit 156. Support comparing unit 154 may be coupled with support information store 148 and with support standards store 150 to effect comparison of support data received from support information store 148 with support standards received from support standards store 150. Support comparing unit 154 may present a support comparison result at a support output locus 155 based upon the support data-support standards comparison. Support evaluating unit 156 may employ the support data-support standards comparison to effect a support determination of whether the monitored support facility complies with support standards stored in support standards store 150.

If support evaluating unit 156 determines that the monitored support facility does not comply with support standards stored in support standards store 150, an output may be presented from support evaluating unit 156 to a support corrective action identification unit 160 via a NO output locus 158. Support corrective action identification unit 160 may generate at least one support corrective action for correcting a failure to comply with at least one support standard, the failure to comply being indicated by the output presented via NO output locus 158. Support corrective action identification unit 160 may present an indication of the identified failure, a support alert, the identified corrective action and other information to a support display unit 162 for viewing by a user or operator of the monitored support facility. Support display unit 162 may be a dedicated display unit associated with system 110, or may be a display unit shared with other systems installed or coupled with the monitored vehicle. Support display unit 162 may be embodied in any unit that may display information including, but not limited to, a video display screen, an indicator light, an array of a plurality of indicator lights or another display array or unit.

A support corrective action tracking unit 161 may be coupled with support corrective action identification unit 160 and support display unit 162. Support corrective action tracking unit 161 may generate an achievement indication regarding level of achievement of a corrective action identified by support corrective action identification unit 160, and support corrective action tracking unit 161 may present achievement indications for display by support display unit 162.

An EcoMx media authoring tool 163 may be provided coupled with support corrective action identification unit 160 for use by a user of system 110 to provide inputs to emphasize, modify or otherwise comment upon corrective actions generated by support corrective action identification unit 160.

Support evaluating unit 156 may also present an indication of the support determination of whether the monitored support facility complies with support standards stored in support standards store 150 via a YES/NO output locus 159 to a report and store unit 166. That is, whether there is compliance with standards or not, an indication of the support determination may be presented at YES/NO output locus 159. Report and store unit 166 may generate at least one report relating to the support determination substantially as described above.

In an alternate embodiment, report and store unit 166 may also provide an indication relating to the operational determination presented at YES/NO output locus 159 to operational display unit 162. This alternative providing is not specifically illustrated in FIG. 2 in order to avoid cluttering FIG. 2. See FIG. 1 for an illustration of such an alternative providing.

System 110 may further include an interface module and EcoMx Graphic User Interface (GUI) 170 to facilitate interoperability between system 110 and other users' maintenance systems, monitoring systems or other automated systems (not shown in FIG. 2). Specific connections between system 110 and interface module and EcoMx Graphic User Interface (GUI) 170 may be extensive in practice, as may be understood by those skilled in the art of system interface design. In order to avoid cluttering FIG. 2, those extensive connections are not specifically illustrated.

Figure 3:
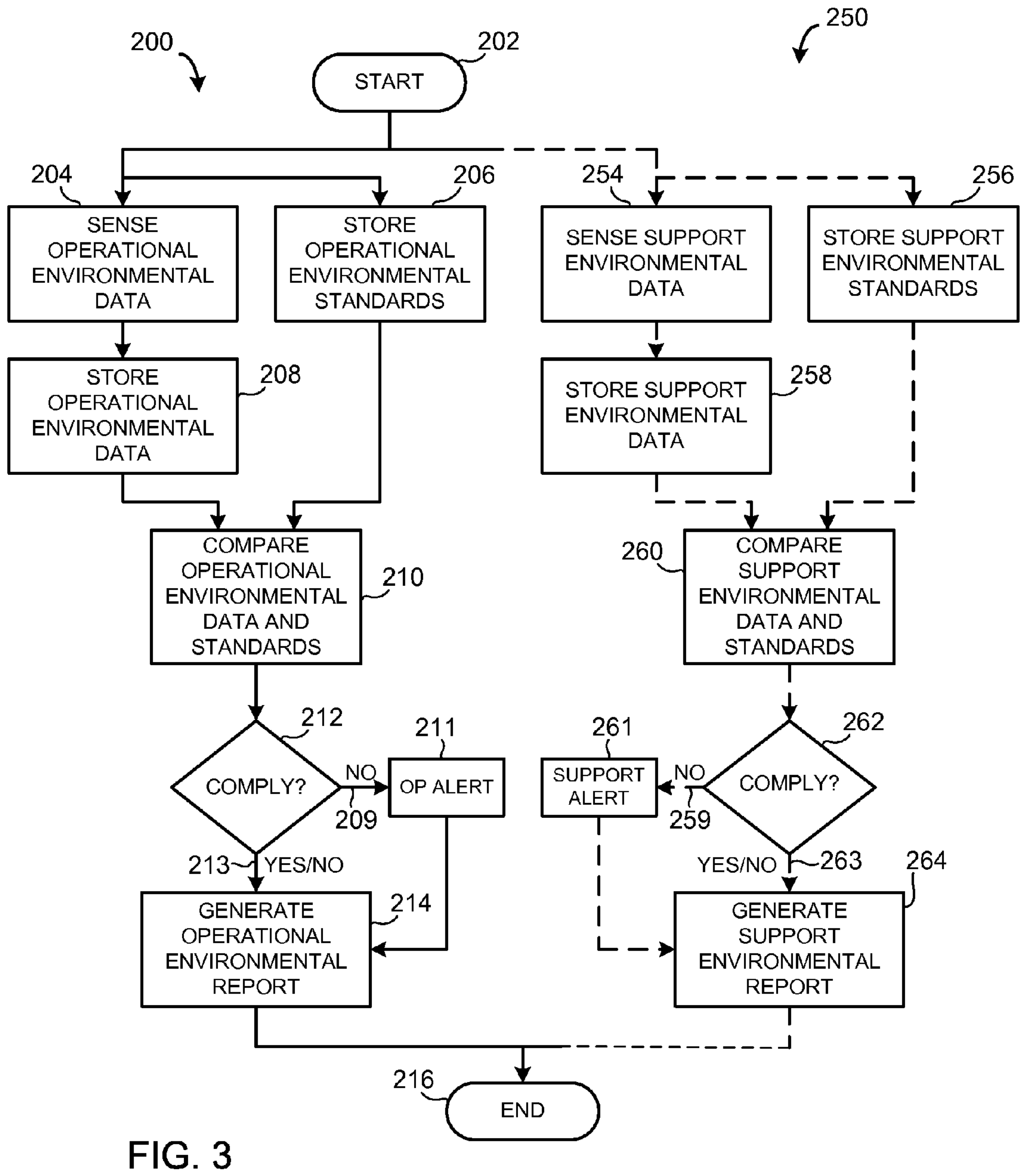
FIG. 3 is a flow diagram illustrating a method for evaluating operation of a vehicle with respect to a plurality of environmental factors according to the teachings of this disclosure.

FIG. 3 is a flow diagram illustrating a method for evaluating operation of a vehicle with respect to a plurality of environmental factors according to the teachings of this disclosure. In FIG. 3, a method 200 for evaluating operation of a vehicle with respect to a plurality of environmental factors may begin at a START locus 202.

Method 200 may continue with, in no particular order: (1) sensing data relating to a plurality of operational factors of the plurality of environmental factors using a plurality of operational sensors installed with the vehicle, as indicated by a block 204; and (2) storing operational standards associated with operating the vehicle in an operational standards store installed with the vehicle, as indicated by a block 206.

Method 200 may continue with storing operational data received from the selected operational sensors relating to the operational factors in at least one operational information store installed with the vehicle, as indicated by a block 208.

Method 200 may continue with comparing the operational data with the operational standards in an operational standard compliance evaluation unit installed with the vehicle to ascertain an operational comparison result, as indicated by a block 210.

Method 200 may continue with effecting an operational determination of whether the vehicle complies with the operational standards based upon the operational comparison result, as indicated by a block 212.

If the vehicle does not comply with the operational standards based on the operational comparison result, method 200 may proceed from block 212 via a NO response line 209 and an operational alert (which may identify a corrective action) may be generated, as indicated by a block 211.

Method 200 may proceed from block 211 to generate at least one report relating to the operational determination, as indicated by a block 214.

Whether there is compliance with standards or not, method 200 may proceed from block 212 via a YES/NO response line 213 to generate at least one report relating to the operational determination, as indicated by a block 214.

Method 200 may continue with generating at least one report relating to the operational determination, as indicated by a block 214.

Method 200 may terminate at an END locus 216.

A method 250 may be performed substantially in parallel with method 200. Method 250 may begin at START locus 202.

Method 250 may continue with, in no particular order: (1) sensing data relating to a plurality of support factors of the plurality of environmental factors using a plurality of operational sensors installed with a support facility supporting the vehicle, as indicated by a block 254; and (2) storing support standards associated with operating the support facility in a support standards store installed with the support facility, as indicated by a block 256.

Method 250 may continue with storing support data received from the selected support sensors relating to the support factors in at least one support information store installed with the support facility, as indicated by a block 258.

Method 250 may continue with comparing the support data with the support standards in a support standard compliance evaluation unit installed with the support facility to ascertain a support comparison result, as indicated by a block 260.

Method 250 may continue with effecting a support determination of whether the support facility complies with the support standards based upon the support comparison result, as indicated by a block 262.

If the vehicle does not comply with the support standards based on the support comparison result, method 250 may proceed from block 262 via a NO response line 259 and a support alert (which may identify a corrective action) may be generated, as indicated by a block 261.

Method 250 may proceed from block 261 to generate at least one report relating to the support determination, as indicated by a block 264.

Whether there is compliance with standards or not, method 250 may proceed from block 262 via a YES/NO response line 263 to generate at least one report relating to the support determination, as indicated by a block 264.

Method 250 may terminate at END locus 216.

It is to be understood that, while the detailed drawings and specific examples given describe preferred embodiments of the disclosure, they are for the purpose of illustration only, that the apparatus and method of the disclosure are not limited to the precise details and conditions disclosed and that various changes may be made therein without departing from the spirit of the disclosure which is defined by the following claims:

We claim:

1. A system for evaluating a transportation operation with respect to a plurality of environmental factors; the system comprising:

a vehicle comprising:

a plurality of operational sensors installed with said vehicle for sensing data relating to a plurality of operational factors of said plurality of environmental factors;

at least one operational information store coupled with selected operational sensors of said plurality of operational sensors and installed with said vehicle for storing operational data received from said selected operational sensors relating to said operational factors;

an operational standards store installed with said vehicle for storing operational standards associated with operating said vehicle;

an operational standard compliance evaluation unit coupled with said operational information store and coupled with said operational standards store; said operational standard compliance evaluation unit effecting comparison of said operational data with said operational standards to ascertain an operational comparison result; said operational standard compliance evaluation unit effecting an operational determination of whether said vehicle complies with said operational standards based upon said operational comparison result; and an operational corrective action identification unit located within said vehicle and coupled with said operational standard compliance evaluation unit and with an operational display unit; said operational corrective action identification unit presenting at least one recommended operational corrective action for correcting a failure to comply with at least one operational standard of said operational standards as indicated by said indication of said operational determination;

a support facility configured to provide maintenance for said vehicle, said support facility comprising:

a plurality of support sensors installed at said support facility, said plurality of support sensors configured to sense data relating to a plurality of support factors of said plurality of environmental factors, wherein said plurality of support sensors comprise at least a ground support equipment parameter sensor, a repair shop sensor, a hanger sensor, and a trainer parameter sensor; and a single report and store unit that comprises an operational report and store unit and a support report and store unit, said operational report and store unit coupled with said operational standard compliance evaluation unit for receiving an indication of said operational determination, said operational report and store unit configured to generate at least one report relating to carbon credits based on said operational determination, wherein said operational report and store unit is at one of said vehicle and said support facility, said support report and store unit configured to generate at least one report related to a support determination based on data sensed by said plurality of support sensors.

2. The system for evaluating a transportation operation with respect to a plurality of environmental factors as recited in claim 1 wherein the system further comprises:

at least one support information store coupled with selected support sensors of said plurality of support sensors and installed with said support facility for storing support data received from said selected support sensors relating to said support factors;

a support standards store coupled with said support facility for storing support standards associated with operating said support facility;

a support standard compliance evaluation unit coupled with said support information store and coupled with said support standards store; said support standard compliance evaluation unit effecting comparison of said support data with said support standards to ascertain a support comparison result; said support standard compliance evaluation unit effecting said support determination of whether said support facility complies with said support standards based upon said support comparison result; and said support report and store unit coupled with said support standard compliance evaluation unit for receiving said indication of said support determination; said support report and store unit generating the at least one report relating to said support determination.

3. The system for evaluating a transportation operation with respect to a plurality of environmental factors as recited in claim 1 wherein said operational report and store unit is additionally configured to perform financial tracking.

4. The system for evaluating a transportation operation with respect to a plurality of environmental factors as recited in claim 2 further comprising a corrective action tracking unit that generates an achievement indication regarding a level of achievement of a corrective action of an identified failure.

5. The system for evaluating a transportation operation with respect to a plurality of environmental factors as recited in claim 1 wherein said at least one operational standards store includes environmental protection agency standards.

6. The system for evaluating a transportation operation with respect to a plurality of environmental factors as recited in claim 2 wherein the system further comprises a support corrective action identification unit coupled with said support standard compliance evaluation unit and to a support display unit; said support corrective action identification unit presenting at least one recommended support corrective action for correcting a failure to comply with at least one support standard of said plurality of support standards as indicated by said indication of said support determination.

7. A system for evaluating an aerospace operation with respect to a plurality of environmental factors; the system comprising:

an aerospace vehicle comprising:

a plurality of operational sensors coupled with said aerospace vehicle for sensing data relating to a plurality of operational factors of said plurality of environmental factors;

at least one operational information store coupled with selected operational sensors of said plurality of operational sensors and installed with said aerospace vehicle for storing operational data received from said selected operational sensors relating to said operational factors;

an operational standards store coupled with said aerospace vehicle for storing operational standards associated with operating said vehicle;

an operational standard compliance evaluation unit coupled with said operational information store and coupled with said operational standards store; said operational standard compliance evaluation unit effecting comparison of said operational data with said operational standards to ascertain an operational comparison result; said operational standard compliance evaluation unit effecting an operational determination of whether said aerospace vehicle complies with said operational standards based upon said operational comparison result; and an operational corrective action identification unit located within said aerospace vehicle and coupled with said operational standard compliance evaluation unit and with an operational display unit; said operational corrective action identification unit presenting at least one recommended operational corrective action for correcting a failure to comply with at least one operational standard of said operational standards as indicated by said indication of said operational determination;

a support facility configured to provide maintenance for said aerospace vehicle, said support facility comprising:

a plurality of support sensors installed at said support facility, said plurality of support sensors configured to sense data relating to a plurality of support factors of said plurality of environmental factors, wherein said plurality of support sensors comprise at least a ground support equipment parameter sensor, a repair shop sensor, a hanger sensor, and a trainer parameter sensor; and a single report and store unit that comprises an operational report and store unit and a support report and store unit, said operational report and store unit coupled with said operational standard compliance evaluation unit for receiving an indication of said operational determination, said operational report and store unit configured to generate at least one report relating to carbon credits based on said operational determination, wherein said operational report and store unit is at one of said aerospace vehicle and said support facility, said single report and store unit configured to generate at least one report related to a support determination based on data sensed by said plurality of support sensors.

8. The system for evaluating an aerospace operation with respect to a plurality of environmental factors as recited in claim 7 wherein the system further comprises:

at least one support information store coupled with selected support sensors of said plurality of support sensors and installed with said support facility for storing support data received from said selected support sensors relating to said support factors;

a support standards store coupled with said support facility for storing support standards associated with operating said support facility;

a support standard compliance evaluation unit coupled with said support information store and coupled with said support standards store; said support standard compliance evaluation unit effecting comparison of said support data with said support standards to ascertain a support comparison result; said support standard compliance evaluation unit effecting said support determination of whether said support facility complies with said support standards based upon said support comparison result; and said support report and store unit coupled with said support standard compliance evaluation unit for receiving said indication of said support determination; said support report and store unit generating the at least one report relating to said support determination.

9. The system for evaluating an aerospace operation with respect to a plurality of environmental factors as recited in claim 7 wherein said operational report and store unit is additionally configured to perform financial tracking.

10. The system for evaluating an aerospace operation with respect to a plurality of environmental factors as recited in claim 8 further comprising a corrective action tracking unit that generates an achievement indication regarding a level of achievement of a corrective action of an identified failure.

11. The system for evaluating an aerospace operation with respect to a plurality of environmental factors as recited in claim 7 wherein said at least one operational standards store includes environmental protection agency standards.

12. The system for evaluating an aerospace operation with respect to a plurality of environmental factors as recited in claim 8 wherein the system further comprises a support corrective action identification unit coupled with said support standard compliance evaluation unit and to a support display unit; said support corrective action identification unit presenting at least one recommended support corrective action for correcting a failure to comply with at least one support standard of said plurality of support standards as indicated by said indication of said support determination.

13. A method for evaluating operation of a vehicle with respect to a plurality of environmental factors; the method comprising:

(a) in no particular order:

(1) sensing, at said vehicle, data relating to a plurality of operational factors of said plurality of environmental factors using a plurality of operational sensors installed with said vehicle;

(2) storing, at said vehicle, operational standards associated with operating said vehicle in an operational standards store installed with said vehicle; and (3) sensing data relating to a plurality of support factors of said plurality of environmental factors using a plurality of support sensors installed at a support facility configured to provide maintenance for said vehicle, wherein the plurality of support sensors include at least a ground support equipment parameter sensor, a repair shop sensor, a hanger sensor, and a trainer parameter sensor;

(b) storing, at said vehicle, operational data received from said selected operational sensors relating to said operational factors in at least one operational information store installed with said vehicle;

(c) comparing, at said vehicle, said operational data with said operational standards in an operational standard compliance evaluation unit installed with said vehicle to ascertain an operational comparison result;

(d) effecting, at said vehicle, an operational determination of whether said vehicle complies with said operational standards based upon said operational comparison result;

(e) generating, at an operational report and store unit, at least one report relating to said operational determination, wherein the at least one report pertains to calculation of carbon credits, and wherein a single report and store unit includes both the operational report and store unit and a support report and store unit configured to generate at least one report related to a support determination based on data sensed by the plurality of support sensors; and (f) presenting, by an operational corrective action identification unit located within the vehicle, at least one recommended operational corrective action for correcting a failure to comply with at least one operational standard of said operational standards as indicated by said operational determination.

14. The method for evaluating operation of a vehicle with respect to a plurality of environmental factors as recited in claim 13 wherein the method further comprises steps performed substantially in parallel with steps (a) through (f):

(g) storing support standards associated with operating said support facility in a support standards store installed with said support facility;

(h) storing support data received from said selected support sensors relating to said support factors in at least one support information store installed with said support facility;

(i) comparing said support data with said support standards in a support standard compliance evaluation unit installed with said support facility to ascertain a support comparison result;

(j) effecting the support determination of whether said support facility complies with said support standards based upon said support comparison result; and (k) generating the at least one report relating to said support determination.

15. The method for evaluating operation of a vehicle with respect to a plurality of environmental factors as recited in claim 14 wherein the method further comprises, following step (k):

(l) presenting at least one recommended support corrective action for correcting a failure to comply with at least one support standard of said plurality of support standards as indicated by said support determination.

16. The system for evaluating a transportation operation with respect to a plurality of environmental factors as recited in claim 1 wherein said support facility is distal from the vehicle.

17. The system for evaluating a transportation operation with respect to a plurality of environmental factors as recited in claim 1 wherein said plurality of operational sensors comprise at least a fuel parameter sensor, a powerplant parameter sensor, and a vehicle usage parameter sensor.

* * * * *